US012800601B2

(12) United States Patent
Mirtchev et al.

(10) Patent No.: US 12,800,601 B2
(45) Date of Patent: Nov. 17, 2026

(54) AUTOMATION COMPATIBLE REMOVABLE LIDS AND METHODS OF USE

(71) Applicant: MESO SCALE TECHNOLOGIES, LLC., Rockville, MD (US)

(72) Inventors: Slavi Mirtchev, Gaithersburg, MD (US); Noel Lawrence, Gaithersburg, MD (US); Manish Kochar, Rockville, MD (US)

(73) Assignee: MESO SCALE TECHNOLOGIES, LLC., Rockville, MD (US)

( * ) Notice: Subject to any disclaimer, the term of this patent is extended or adjusted under 35 U.S.C. 154(b) by 18 days.

(21) Appl. No.: 17/998,755

(22) PCT Filed: May 14, 2021

(86) PCT No.: PCT/US2021/032569

§ 371 (c)(1),
(2) Date: Nov. 14, 2022

(87) PCT Pub. No.: WO2021/231938

PCT Pub. Date: Nov. 18, 2021

(65) Prior Publication Data

US 2023/0202725 A1 Jun. 29, 2023

Related U.S. Application Data

(60) Provisional application No. 63/025,344, filed on May 15, 2020.

(51) Int. Cl.

*G01N 35/00* (2006.01)
*B01L 3/00* (2006.01)

(Continued)

(52) U.S. Cl.

CPC ........ *G01N 35/0099* (2013.01); *B01L 3/5055* (2013.01); *B01L 3/50853* (2013.01);

(Continued)

(58) Field of Classification Search

CPC ......... B01L 2200/026; B01L 2300/044; B65D 2543/00824; B65D 43/0214; B65D 2231/022; B65D 2543/0037

(Continued)

(56) References Cited

U.S. PATENT DOCUMENTS 4,177,906 A * 12/1979 Von Hagel ......... B65D 41/3404 215/901
5,111,946 A * 5/1992 Glanz ................ B01L 3/50825 215/249

(Continued)

FOREIGN PATENT DOCUMENTS

EP 0836884 A2 4/1998
JP 2001074751 A 3/2001
JP 2013104769 A 5/2013

*Primary Examiner* — Robert J Hicks
*Assistant Examiner* — Sanjidul Islam
(74) *Attorney, Agent, or Firm* — MEDLER FERRO WOODHOUSE & MILLS PLLC

(57) ABSTRACT

Automation compatible removable lids are provided. The removable lids include a top surface surrounded by a peripheral rim. The removable lids further include septal portions configured to receive an extractor, such as a pipette tip, inserted therethrough. The septal portions are further configured to grip the extractor to facilitate lid removal.

16 Claims, 12 Drawing Sheets

(51) Int. Cl.
*B65D 43/02* (2006.01)
*B65D 43/26* (2006.01)
*B65D 51/24* (2006.01)

(52) U.S. Cl.
CPC ........ *B01L 3/5457* (2013.01); *B65D 43/0214* (2013.01); *B65D 43/26* (2013.01); *B65D 51/243* (2013.01); *B01L 2200/026* (2013.01); *B01L 2300/044* (2013.01); *B65D 2543/00296* (2013.01); *B65D 2543/00333* (2013.01); *B65D 2543/0037* (2013.01); *B65D 2543/00824* (2013.01)

(58) Field of Classification Search
USPC .......................................................... 220/281
See application file for complete search history.

(56) References Cited

U.S. PATENT DOCUMENTS

| | | | |
|---|---|---|---|
| 12,239,605 B2 | 3/2025 | Vollen et al. | |
| 2014/0038228 A1 | 2/2014 | Percy et al. | |
| 2016/0068313 A1* | 3/2016 | Hart ..................... | B65D 43/169 220/254.2 |
| 2016/0296937 A1* | 10/2016 | Ono ........................ | B01L 9/543 |
| 2018/0290798 A1* | 10/2018 | Peng .................. | A47G 19/2272 |
| 2019/0062010 A1 | 2/2019 | Apte et al. | |

* cited by examiner

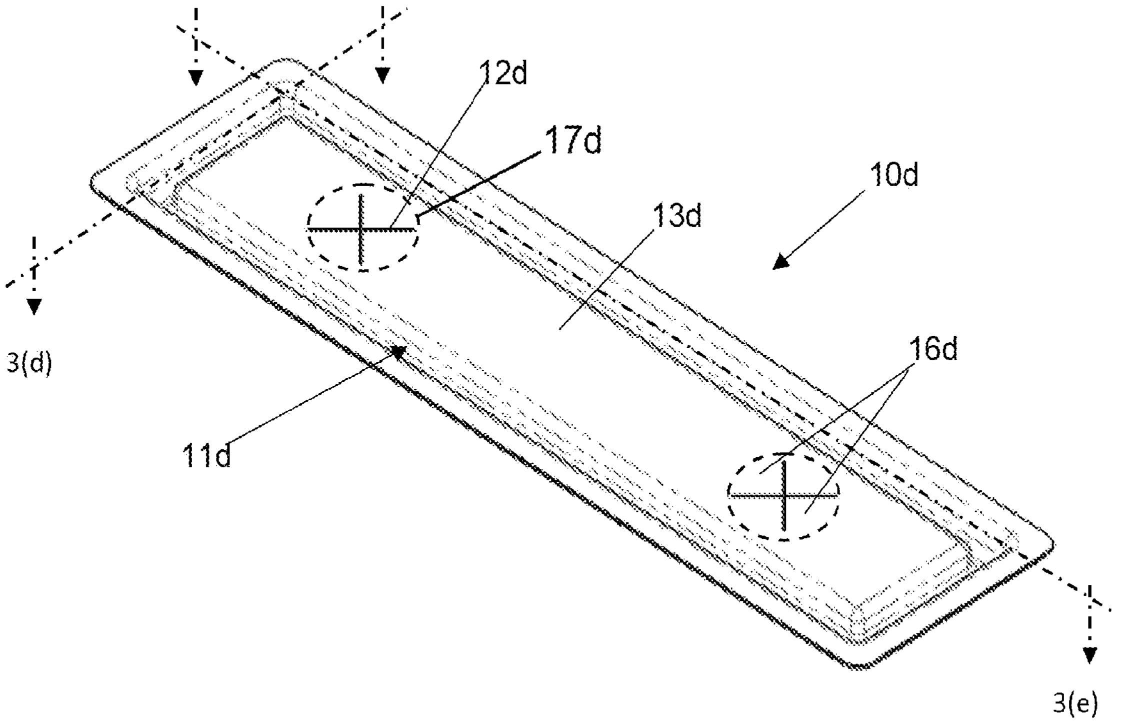
FIG. 3(c)
FIG. 3(d)
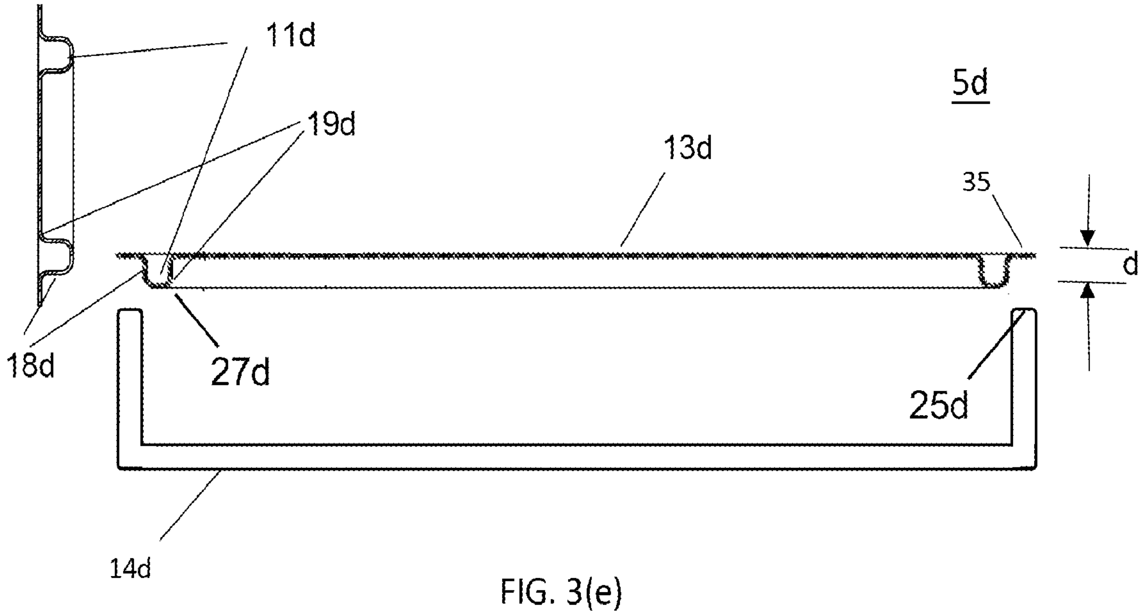
FIG. 3(e)

AUTOMATION COMPATIBLE REMOVABLE LIDS AND METHODS OF USE

FIELD OF THE INVENTION

The present disclosure relates to removable lids for automated systems, and methods for removing such lids. Purposes for the lids and methods may include minimizing evaporation of reagents or samples stored in containers that are used in automated instruments and protecting reagents and samples from light in such instruments.

BACKGROUND OF THE INVENTION

Many automated systems require removal of lids used to cover containers. Such automated systems may be used within automated instruments. Such automated instruments may also include a robotic gripper arm, a robotic pipetting system or other handling mechanisms for manipulating multi-well plates, plate lids, pipette tips and other consumables. They may manipulate samples and reagents stored in containers during extended experiments. These experiments may extend up to 8 hours or more. Liquids, samples or other reagents placed in open containers are exposed to the internal or ambient (e.g., external) atmosphere and can evaporate or be exposed to light.

Evaporation causes the loss of components, e.g., volatile components, contained in the reagents or samples and thereby changes the concentration of dissolved substances in the reagents or samples. Exposure to light can also deleteriously affect components of reagents or samples that are light-sensitive. These effects can influence the activity and/or volume of the reagents or samples. For certain reagents or samples, this may become particularly important when the open containers are placed in a system for a period of several hours before they are used. And for reagents or samples containing components with a high vapor pressure such as ethanol and acetonitrile, the effects of evaporation may be significant over a much shorter duration. Likewise, for light-sensitive reagents or samples, exposure to light may be deleterious after a short or a long duration, depending on the sensitivity of the component to light.

Various approaches for controlling evaporation of reagents with additional robotic hardware to supplement automated liquid handling systems have been attempted. For example, automated analysis devices may include lid opening and closing hardware. Such hardware may include, for example, mechanical systems and robotic components configured to facilitate lid opening. However, having an additional robotic hardware that opens and closes lids on reagent containers within the automated analysis system adds additional complexity.

Embodiments provided herein address these aforementioned drawbacks in providing lids that facilitate both the addition of reagents and other substances through the lids and the automated removal of the lids.

SUMMARY OF THE INVENTION

The present invention relates to a substance containment system adapted for use in a system, for example an assay system. The substance containment system includes a container having a body adapted to hold a reagent or sample and at least one lid configured for placement on the container.

In an embodiment, a lid adapted for use in an automated system is provided. The lid includes a top surface; a rim disposed around a periphery of the top surface, the rim comprising a periphery and at least one skirt, the periphery being configured to rest on a lip portion of a container; and a plurality of angular segments in the top surface defined by a cut pattern in the top surface and defining a septal portion of the top surface, the angular segments being configured to permit an extractor to be inserted through the cut pattern and to grip the extractor by a friction force such that the lid is removed from the container when the extractor is pulled away from the container.

In an embodiment, a substance containment system for use in an automated system is provided. The substance containment system includes a container configured to contain the substance; and a lid configured to cover the container, the lid comprising: a top surface; a rim disposed around a periphery of the top surface, the rim comprising a periphery and at least one skirt, the periphery being configured to rest on a lip portion of the container; and a plurality of angular segments in the top surface defined by a cut pattern in the top surface and defining a septal portion of the top surface, the angular segments being configured to permit an extractor to be inserted through the cut pattern and to grip the extractor by a friction force such that the lid is removed from the container when the extractor is pulled away from the container.

The mass of the lid may be less than about 5 grams, preferably less than about 2.5 grams or about 1 gram and more preferably less than about 0.75 gram. The extractor may comprise at least one pipette tip. The angular segments are preferably coated with a frictional enhancement material. In one embodiment, the at least one lid comprises four angular segments. In another embodiment, the at least one lid comprises a plurality of disposable lids. The at least one lid may be attached to a pierceable liquid tight layer.

A reagent or sample contained in containers described herein may be a liquid and may be selected from the group consisting of samples to be analyzed, reagents, diluents, and combinations thereof. In an embodiment, the at least one lid is substantially clear, opaque material, or UV resistant. The at least one lid may be made from a hydrophobic material or may be coated with a hydrophobic coating. The at least one lid may be made from high density polyethylene or polyvinyl chloride, and preferably has a thickness from about 0.0025 inch to about 0.030 inch. In an embodiment, the lid may be made from a conductive polymer blend or an anti-static or static dissipative material. Such a composition may mitigate the effect of build-up of static charges on the lid and resulting attractive or repulsive forces between the lid and other objects that may cause unintended motion of the lid or difficulty in handling and placement of the lid.

In an embodiment, a method for removing a lid from a container in an automated system is provided. The method includes placing a lid on the container to cover a sample or reagent in the container, the lid comprising a cut pattern, piercing the lid with an extractor through the cut pattern, moving the extractor with the lid being attached thereto by frictional force away from the container, and discarding the extractor and the lid.

The method may further comprise the step of minimizing evaporation from the at least one reagent or sample in said container. The method may also comprise the step of minimizing light exposure to the at least one reagent or sample in said container. The sample or reagent can be volatile or light-sensitive, and the lid is preferably substantially clear, opaque or UV resistant. The system may comprise an automated handling subsystem that conducts steps (b) through (d).

The extractor may comprise at least one pipette tip, and the at least one container may be covered with another lid.

BRIEF DESCRIPTION OF THE DRAWINGS

The accompanying drawings show non-limiting exemplary embodiments and form a part of the specification and are to be read in conjunction therewith and in which like reference numerals are used to indicate like parts in the various views:

FIG. 2(*b*) is a top view of a removable lid according to embodiments hereof.

FIG. 2(*c*) is an exploded view a container and a removable lid according to embodiments hereof.

FIG. 3(*b*) is a side view of the lid of a removable lid according to embodiments hereof.

FIG. 3(*c*) is a top perspective view of a removable lid according to embodiments hereof.

FIGS. 3(*d*) and 3(*e*) are cross-sectional views of the removable lids of FIG. 3(*c*) along lines 3(*d*) and 3(*e*), respectively according to embodiments hereof.

FIG. 4(*b*) is a 3-D displacement plot of a removable lid with a displaced septal portion according to embodiments hereof.

FIG. 4(*c*) is a 3-D stress plot of a removable lid with a displaced septal portion according to embodiments hereof.

FIG. 4(*d*) is a 3-D displacement plot of a removable lid with a displaced septal portion according to embodiments hereof.

FIG. 4(*e*) is a 3-D stress plot of a removable lid with a displaced septal portion according to embodiments hereof.

FIG. 4(*f*) is a 3-D displacement plot of a removable lid with a displaced septal portion according to embodiments hereof.

DETAILED DESCRIPTION OF THE EMBODIMENTS

Figure 1:
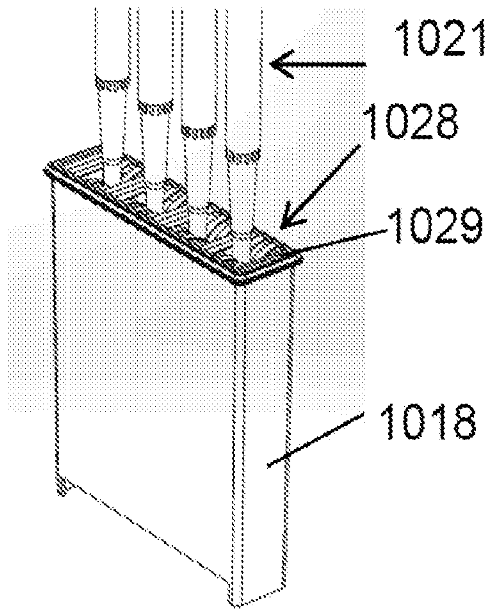
FIG. 1 Background Art
FIG. 1 shows pipette tips penetrating a lid having a pattern of cuts thereon and covering a reagent container.

Automated instruments are instruments that run analyses or assays in accordance to instructions substantially without input from a technician after the samples to be analyzed, assay consumables, or reagents are loaded. Such automated instruments often include automated liquid handling systems. The duration of the analyses or assays conducted by an automated instrument may extend for a number of hours, during which some of the reagents, such as tripropylamine (TPA), ethanol and acetonitrile, or samples may evaporate. Other reagents or samples may be sensitive to light. Accordingly, reagent containers, sample containers (e.g., assay plates), troughs, and other containers associated with the use of automated instrumentation systems frequently require lids.

Conventional methods, systems, and devices for lid removal may introduce several drawbacks. First, robotic arms (or other robotic lid removal devices) employed to remove lids in some existing systems may crash into or otherwise interfere with automated pipetting heads in these systems. Although both automated robot lid removal devices and automated pipettors may operate independently, they may operate within the same volume and thus create a risk of contacting, crashing, or otherwise interfering with one another.

Second, system run time (e.g., time to perform all steps of an assay), may be lengthened significantly due to the need to introduce a robotic lid removal device to remove lids during assay performance. Lids may be left on containers within the system for as long as possible to reduce evaporation and other issues generated by open containers. Accordingly, pipetting actions must be temporarily suspended to permit lid removal by robotic lid removal devices. In some cases, to ensure that robotic lid removal devices and automated pipettors do not interfere, the automated pipettors may be removed from the work volume to permit the introduction of the robotic lid removal devices. The swapping back and forth of the two automated components within the work volume can add significant amounts of time to assay performance.

Third, switching between robotic lid removal devices and automated pipettors lengthens the amount of time that reagents, samples, and other fluids are exposed to the environment with no lid before pipetting occurs. Thus, even though the lids prevent evaporation while they cover the containers, the time taken to switch automated components creates a window during which evaporation may occur.

Fourth, in some systems, robotic lid removal devices are designed and optimized to work with a specific type of lid having specific features. This necessitates the use of a particular lid in a particular system. Use of different types of lids that may be supplied with different types of products may therefore be limited.

Aspects of the present disclosure address each of these drawbacks. The present disclosure is directed to removable lids for troughs, reagent containers, assay plates, and other containers and methods of their use. Lids and containers, as disclosed herein, may make up substance containment systems. The lids are configured for removal from the containers by automated, semi-automated, or manual manipulation systems, such as robotic or automated pipettors. Such a robotic system may be part of an automated instrument.

Removable lids, as disclosed herein and described in greater detail below, include slits or cuts that create or define septal portions of the lids by defining angular segments that bend to allow one or more extractors, such as pipette tips, to penetrate the lid. The angular segments are further configured to grip the extractors after entry of the extractors. As the extractors or pipette heads are lifted away from the containers, the lids are also lifted away due to the gripping force of the angular segments. In embodiments, as the automated manipulation system ejects the extractors into a solid waste container, the lids are also discarded. Accordingly, the removable lids disclosed herein are configured to permit lifting and removal by the pipette heads of an automated pipetting system.

The removable lids, therefore, address the issues discussed above by eliminating the need for the use of a specific robotic lid removal device to accomplish lid removal. By employing an automated pipetting system in the task of lid removal, many of the drawbacks associated with automated lid removal systems may be reduced or eliminated. First, because there is no need to operate both a robotic lid removal device and an automated pipetting system in the same work volume, the potential for crashes, contact, and/or interference between such systems may be greatly reduced. Second, because there is no need to operate both a robotic lid removal device and an automated pipetting system in the same work volume, it is not necessary to switch between one automated component and another automated component. This eliminates the excess run time created by such switching. Third, evaporation may be reduced because the automated pipetting system used to remove the lids may be immediately employed for pipetting purposes without a requirement to switch automated systems within the work volume. Finally, removable lids disclosed herein may provide increased universality. Because the removable lids disclosed herein are configured for removal by pipetting heads, they may eliminate the need for specifically designed/configured robotic grippers or lid removal devices for compatibility. Accordingly, removable lids as described herein may be compatible with a greater number of existing systems.

Although some reagent containers exist having securely attached lids with features permitting pipette heads to penetrate therethrough, these differ significantly from the lids disclosed in the present embodiments. Probes, such as pipette tips, push through these attached lids to access the liquid reagents in the containers. These lids are required to remain on the reagent containers throughout the operation of the automated systems. If such lids were to grip the pipette heads in a manner consistent with the embodiments described herein, they would not be operating as intended and may cause system and assay run failures. A drawback of such attached lids with slits is that they remain attached or adhered to the reagent containers and accessing the liquid contents therein requires tight alignment of the probes to the slits each time the liquid reagent is needed for the analysis and a relatively significant force is required to push through passthrough features in the elastomeric lids.

Although embodiments discussed herein are described with respect to the use of pipette heads as extractors, other suitable extractors may be used, including any devices or structures with the shape and size of a pipette heads. It may be convenient because it does not necessitate the addition of additional materials to a system, but it is not required that the extractors be pipette heads. Some embodiments may include structures configured for use with an automated pipetting system without all of the features of pipette heads. For example, such structures may have a solid core and/or may be made from different materials than pipette heads.

The present disclosure is further directed to a method for removing a lid from a container in a system or instrument, including but not limited to an automated instrument. The method may be useful for minimizing evaporation or light exposure in, e.g., automated systems or instruments as well as reducing the above-described drawbacks associated with some robotic lid removal devices and/or systems. In a disclosed method, lids that removably fit over the lip or upper portion of reagent or sample containers are provided. The system or instrument's operator may place the lids on top of these containers before loading the labware on to the system or instruments. The lids may be left in place until the use of the samples or reagents in the containers to minimize evaporation or exposure to light. An extractor, preferably a disposable pipette tip attached to an automated pipetting system or liquid handling/manipulating system, may be used to spear the lids at the cut pattern or septal portion. A frictional or gripping force between the extractor and the lid keeps the lid attached or adhered to the extractor. As the extractor is lifted away from the container, the lid is removed and, when the extractor is ejected, the lid is discarded. An advantage of the disclosed method is that it does not require complex decamping or lid removing apparatus described in the prior art. Furthermore, the inventive method utilizes consumables, such as pipette tips as extractors, that are normally included in the automated assay instruments to remove lids, thereby simplifying lid removal process.

In a non-limiting embodiment, the disclosed lids disclosed may be used in automated technology, including but not limited to partially automated, e.g., one or more modular instruments, or a fully integrated, automated instrument. Alternatively, the disclosed lids may be used in any assay or liquid handling or manipulating systems.

Exemplary automated systems or automated instruments (modular and fully integrated) may include the following automated subsystems: computer subsystem(s) that may comprise hardware (e.g., personal computer, laptop, hardware processor, disc, keyboard, display, printer), software (e.g., processes such as drivers, driver controllers, and data analyzers), and database(s); liquid handling or manipulating subsystem(s), e.g., sample handling and reagent handling, e.g., robotic pipetting head, syringe, stirring apparatus, ultrasonic mixing apparatus, magnetic mixing apparatus; sample, reagent, and consumable storing and handling subsystem(s), e.g., robotic manipulator, tube or lid or foil piercing apparatus, lid removing apparatus, conveying apparatus such as linear and circular conveyors and robotic manipulators, tube racks, plate carriers, trough carriers, pipet tip carriers, plate shakers; assay reaction subsystem(s), e.g., fluid-based and consumable-based (such as tube and multi well plate); container and consumable washing subsystem(s), e.g., plate washing apparatus; magnetic separator or magnetic particle concentrator subsystem(s), e.g., flow cell, tube, and plate types; detection subsystem(s) such as colorimetric, fluorescence, and ECL detectors; temperature control subsystem(s), e.g., air handling, air cooling, air warming, fans, blowers, water baths; waste subsystem(s), e.g., liquid and solid waste containers; global unique identifier (GUI) detecting subsystem(s) e.g., 1D and 2D bar-code scanners such as flat bed and wand types, and RFID reader devices.

Systems or modules that perform sample preparation may be combined with (or be adjoined to or adjacent to or robotically linked or coupled to) systems or modules that perform assays and that perform detection or that perform both. Multiple modular systems of the same kind may be combined to increase throughput. Modular system(s) may be combined with module(s) that carry out other types of analysis such as chemical, biochemical, and nucleic acid analysis.

Automated systems consistent with the disclosure may allow batch, random-access, and point-of-care workflows and single, medium, and high sample throughput. The system may comprise, for example, one or more of the following devices: plate sealer (e.g., Skymark), plate washer (e.g., TECAN, Biotech), reagent dispenser and/or automated pipetting station and/or liquid handling station (e.g., Skymark, Lab systems, Beckman, TECAN), incubator (e.g., Skymark), plate shaker (e.g., Skymark), compound library or sample storage and/or compound and/or sample retrieval module. One or more of these devices is coupled to the apparatus of the invention via a robotic assembly such that the entire assay process can be performed automatically. According to a further embodiment, containers (e.g., plates) are manually moved between the apparatus and various devices by manually moving them (e.g., stacks of plates).

The automated system may be configured to perform one or more of the following functions: (a) moving consumables such as plates into, within, and out of the detection subsystem, (b) moving consumables between other subsystems, (c) storing the consumables, (d) sample and reagent handling (e.g., adapted to mix reagents and/or introduce reagents into consumables), (e) consumable shaking (e.g., for mixing reagents and/or for increasing reaction rates), (f) consumable washing (e.g., washing plates and/or performing assay wash steps (e.g., well aspirating)), (g) measuring ECL in a flow cell or a consumable such as a tube or a plate. The automated system may be configured to handle multi-well plates such as 96 or 384 well plates.

Exemplary automated systems are discussed and described in commonly owned international patent application publication Nos. WO 2018/017156 and WO 2017/015636 entitled "Integrated Consumable Data Management System & Platform," discussed above, and international patent application publication No. WO 2016/164477 entitled "High Throughput System for Performing Assays Using Electrochemiluminescence including a Consumable Shaking Apparatus. These three references are incorporated herein by reference in their entireties.

Figures 2A, 2B, 2C:
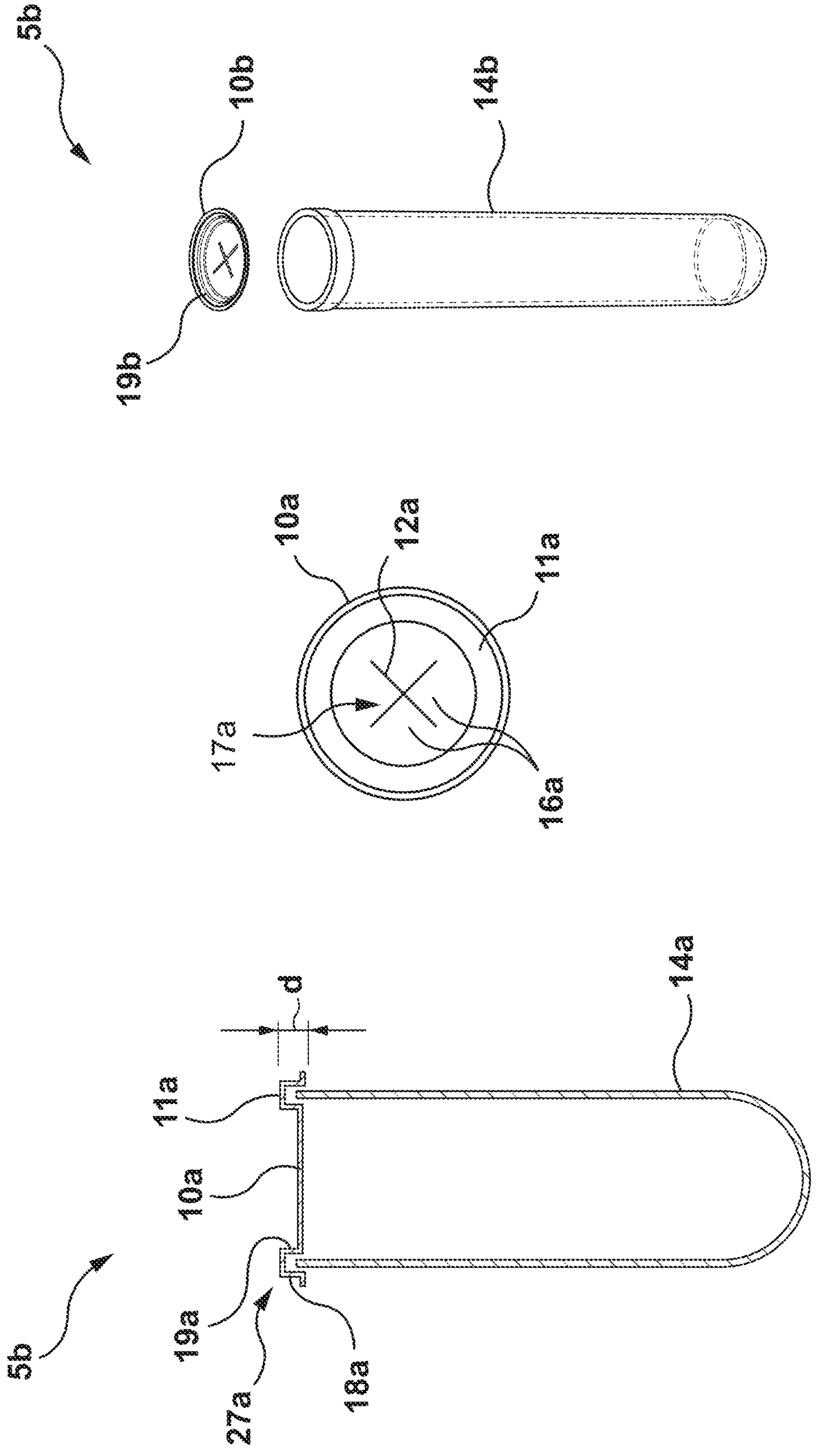
FIG. 2(*a*) is a cross-sectional view of a container and a removable lid according to embodiments hereof.

FIGS. 2(*a*) and 2(*b*) illustrate a container and removable lid consistent with embodiment hereof. The lid (10*a*) and container (14*a*) make up a substance containment system (5*a*). The removable lid (10*a*) includes a top surface (13*a*) with a rim (27*a*) disposed around a circumference or perimeter thereof. The top surface (13*a*) is an approximately planar portion of material. The removable lid (10*a*) further includes at least one intersecting cut pattern (12) defining a septal portion (17*a*) and configured to cover a container (14*a*). The intersecting cut pattern (12) may include at least two intersecting cut lines penetrating the top surface (13*a*) of the removable lid (10*a*) forming a starburst-like pattern creating a plurality of angular segments (16*a*) to define septal portion (17*a*). As illustrated, lid (10*a*) may include a cut pattern (12*a*) to allow an extractor, such as pipette tips (1021) illustrated in FIG. 1 from a robotic or automated pipette system, to be inserted therethrough. The lid (10*a*) is configured with a depth (d) that allows lid (10*a*) to rest securely on top of container (14*a*), as described below. The extractor(s)/pipette tip(s) (1021) when inserted through the cross-cuts may be used to lift and transport the lid (10*a*) from container (14*a*) and dispose of it into a solid waste container.

As shown FIG. 2(*a*), lid (10*a*) may sit removably on top of the top edge of container (14*a*) without significantly contacting, touching, or gripping the vertical side(s) of the container. Lid (10*a*) includes a rim (27*a*) that includes a top periphery (11*a*), an outer skirt (18*a*), and an inner skirt (19*a*). The inner skirt (19*a*) projects approximately vertically upward from an outer periphery of the top surface (13*a*) of the lid (10*a*). The top periphery (11*a*) extends horizontally, creating an annular surface, from the inner skirt (19*a*). The outer skirt (18*a*) projects approximately vertically downward from an outer periphery of the top periphery (11*a*). Thus, the rim (27*a*) defines an annular recess (28*a*) configured with a diameter suitable for resting on a top rim (25*a*) of the container (14*a*). An underside of the top periphery (11*a*) is configured to rest on the container (14*a*) and the rim (27*a*) may be configured so as not to grip or otherwise attach to the container (14*a*). The outer skirt (18*a*) may have a diameter larger than that of a top rim (25*a*) of container (14*a*). The inner skirt (19*a*) may have a diameter smaller than that of the top rim (25*a*) of container (14*a*). Frictional contact between the rim (27*a*) and container (10*a*) is thus minimized or reduced to zero or near zero.

As illustrated, cut pattern (12*a*) may include 2 intersecting line segment cuts forming four angular segments (16*a*) of the septal portion (17*a*). Cut pattern (12*a*) may have any suitable number of intersecting line segments, e.g., three, four or five, etc. and a corresponding number of angular segments (16*a*), e.g., six, eight or ten, etc. The material and surface roughness of lid (10*a*) are selected in conjunction with the material and surface roughness of the extractor(s), such as pipette tips (1021), such that the frictional force between the extractor(s) and the angular segments (16*a*) is sufficient to hold the weight of lid (10*a*) such that segments (16*a*) can grip onto the extractors during the lifting operation. Frictional force, if any, between periphery (11*a*) and container (14*a*) and between skirts (18*a*, 19*a*) and container (14*a*) is minimal or nearly zero due to the looseness of the fit of lid (10*a*) over container (14*a*). There may be a small amount of surface tension between the sample or reagent contained in the container and lid (10*a*) if the sample or reagent wets lid (10*a*). The angular segments (16*a*), in conjunction with the extractor(s), are configured to generate a lifting force larger than the weight of the lid (10*a*) plus any friction or surface tension holding the lid (10*a*) to the container (14*a*).

In further embodiments, the top rim (25*a*) may be configured to provide a gripping or frictional force on the container (14*a*) that, when added to the weight of the lid (10*a*), is less than the force generated by an extractor used to lift the lid (10*a*) via the septal portion (17*a*). In further embodiments, the inner skirt (19*a*) and the outer skirt (18*a*) may project from the lid (10*a*) and the periphery (11*a*) at angles other than approximately vertically with respect to the lid (10*a*). In further embodiments, the lid (10*a*) may be a shape other than round, e.g., square and/or rectangular. In such embodiments, the periphery (10*a*) may not be annular in shape, but may be shaped to conform to the outer perimeter of the lid (10*a*), in whatever shape it is in.

In further embodiments, the angular segments (16*a*) may be coated with a frictional enhancement material, such as adhesive, to increase their tackiness. After the extractors are inserted through cut the patterns (12*a*), the frictional enhancement layer increases the coefficient of friction and thereby the frictional force applied when the lid (10*a*) is removed. When a frictional enhancement layer is used, lids having higher weights may be lifted. Alternatively, the frictional enhancement layer may be coated on the extractor, or both the extractor and the cut pattern.

Lid (10*a*) may be made from relatively rigid material or non-elastomeric material, such as polyester, high density polyethylene (HDPE) or polycarbonate. The flexibility of the lid (10*a*) may thus be provided by the cut patterns. The lid (10*a*) may be thermoformed or vacuum formed and the cut pattern (12*a*) may be die cut. Thermoforming is a process of heating a plastic sheet and forming its shape with air pressure on a mold and vacuum forming is a similar process, but vacuum is used instead of air pressure. The lid (10*a*) may be made from polystyrene, polypropylene, cyclic olefin copolymer (COC) or any other material commonly used in biological studies. Further, the lid 10(*a*) may be made from conductive, anti-static, and/or static dissipative materials.

To further minimize inconsistent evaporation and condensation, lid (10*a*) may be made from a hydrophobic polymer and/or other hydrophobic materials. In embodiments, the bottom of lid (10*a*) may be coated with a hydrophobic coating or otherwise rendered hydrophobic.

The mass of the lids disclosed herein may generally be small, for example, less than about 5 grams or less than about 2.5 grams. The mass of the lid may further be less than about 1 gram or less than about 0.75 gram. For example, the lid (10*c*), illustrated in FIGS. 3(*a*) and 3(*b*), may have mass of about 0.67 grams. The weight of a lid is simply its mass times the gravitational constant of about 9.8 $m/s^2$ at sea level. The weight of the lid (10*c*) shown in FIGS. 3(*a*) and (*b*) is about 0.006566 kilopond (or kilogram-force), which is equivalent to 0.0144452 lbf or 0.231 ounce-f One pound-force (lbf) is the product of one pound-mass times gravity at sea level.

Lids as disclosed herein may have weights less than about 1.5 ounce-f, preferably less than about 1.25 ounce-f. In examples, the weight may be less than about 1 ounce-f, less than about 0.75 ounce-f, or less than about or 0.5 ounce-f.

Lids consistent with embodiments herein may be made from high density polyethylene (HDPE) or polyvinyl chloride (PVC) having a top surface thickness from about 0.0025 inch to about 0.030 inch, about 0.005 inch to about 0.020 inch or from about 0.0125 inch to about 0.0175 inch, or about 0.015 inch. The lids may be made from a clear plastic such as PVC, to permit a visual check to confirm whether reagent is in the container before loading. The lid may be made from an opaque material, such as high impact polystyrene, in case the reagent is light sensitive. The lid may also be UV (ultra-violet) resistant, e.g., made from a UV resistant material or be coated with a UV resistant coating.

FIG. 2(*c*) illustrates a lid (10*b*) and container (14*b*) consistent with embodiments hereof. The lid (10*b*) and container (14*b*) make up a substance containment system (5*b*). The lid (10*b*) is similar to lid (10*a*) illustrated in FIGS. 2(*a*) and 2(*b*) and includes all features and functionality of the lid (10*a*) except where explicitly stated. The lid (10*b*) includes a rim (27*b*) having an inner skirt (19*b*) and a periphery (11*b*) similar to those of the rim (27*a*), but does not include an outer skirt. The inner skirt (19*b*) projects upward from an outer perimeter of the lid (10*b*). The periphery (11*b*) provides an annular surface projecting horizontally from the inner skirt (19*b*) and provides a surface that rests on a top edge (25*b*) of the container (14*b*). In further embodiments, the inner skirt (19*a*) may project from the lid (10*b*) at an angle other than approximately vertically with respect to the lid (10*b*). The lid (10*b*) may be manipulated by an extractor in the same manner as the lid (10*a*), described above.

Frictional force is well understood and is the product of the coefficient of friction between two surfaces in contact to each other times the normal force, i.e., the resultant force perpendicular to the contacting surfaces. In this example, since the extractor(s) are substantially in static contact with segments (16*b*), the coefficient of friction is the static coefficient. The normal force is provided by the spring-like force applied by segments (16*b*) on the extractor.

Figure 3A:
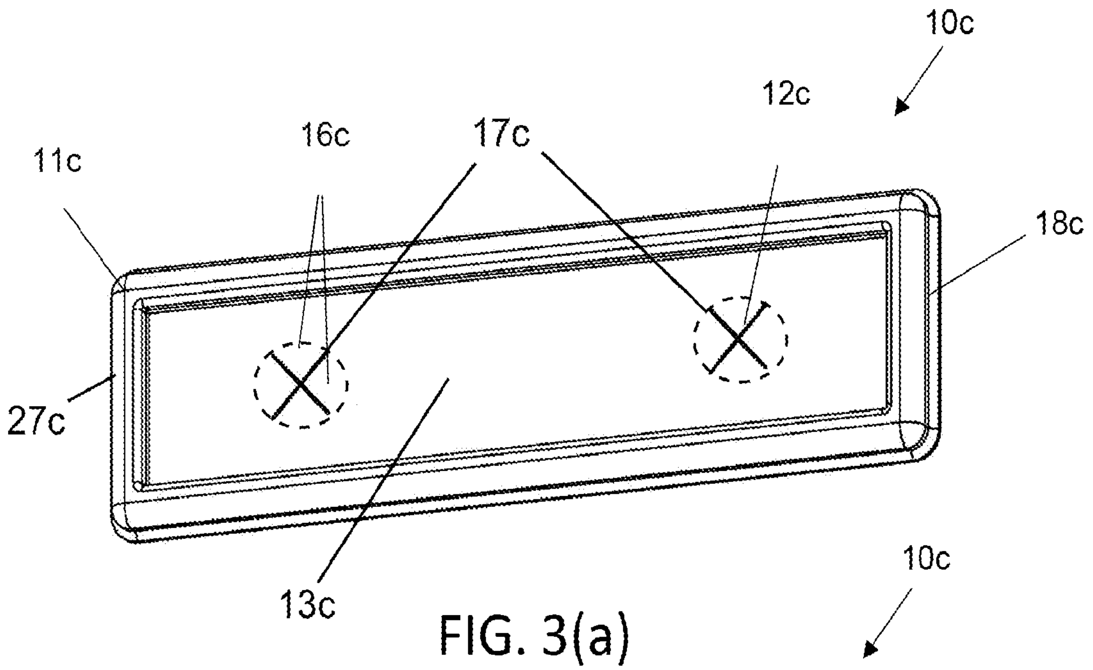
FIG. 3(*a*) is a top perspective view of a removable lid according to embodiments hereof.
Figure 3B:
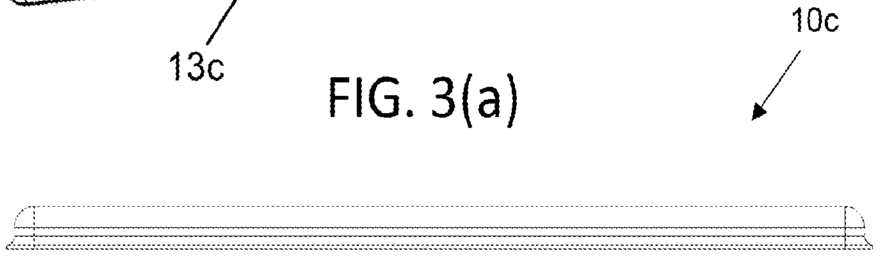
Figure 4A:
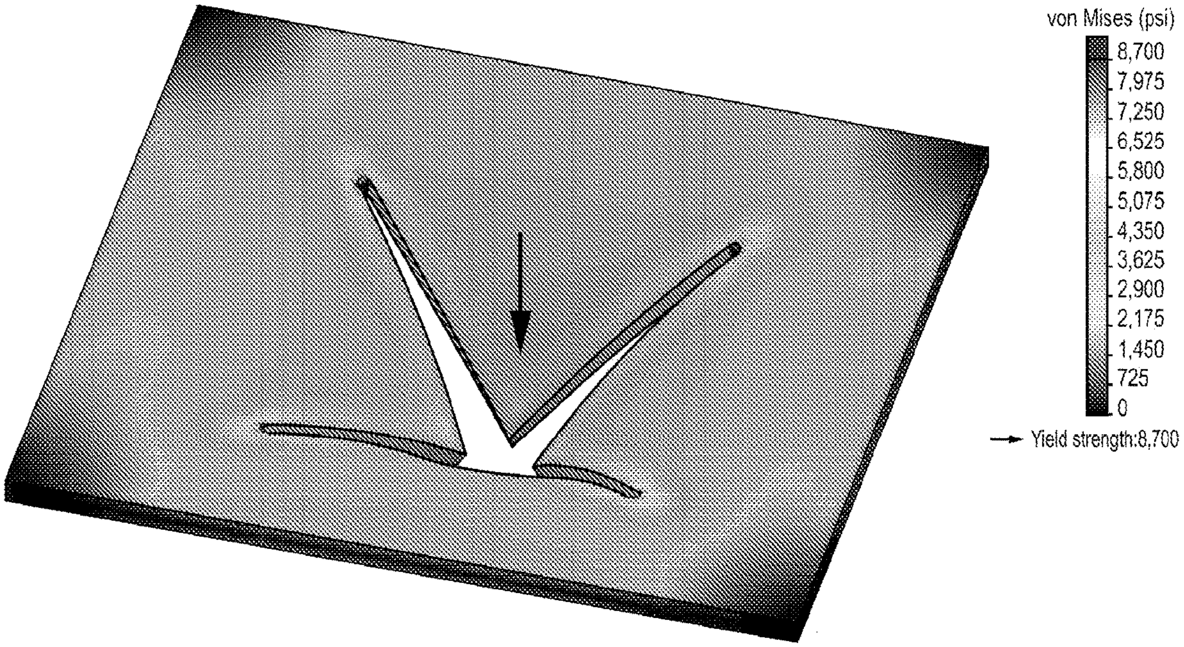
FIG. 4(*a*) is a 3-D stress plot of a removable lid with a displaced septal portion according to embodiments hereof.
Figure 4B:
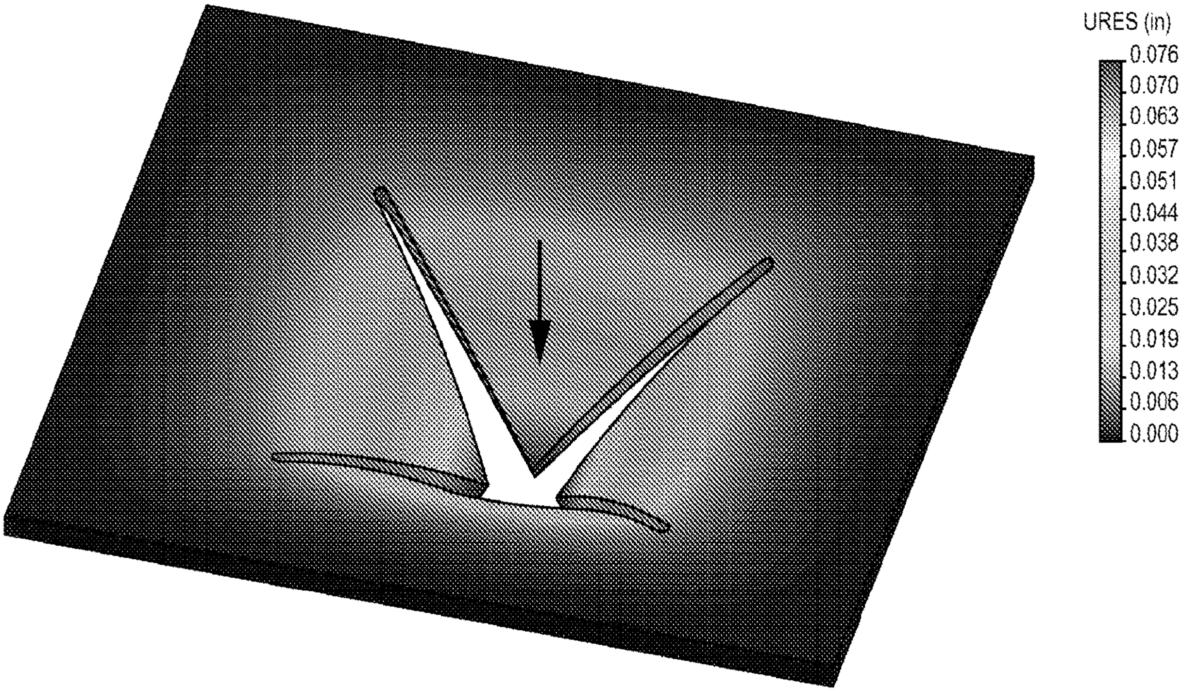
Figure 4C:
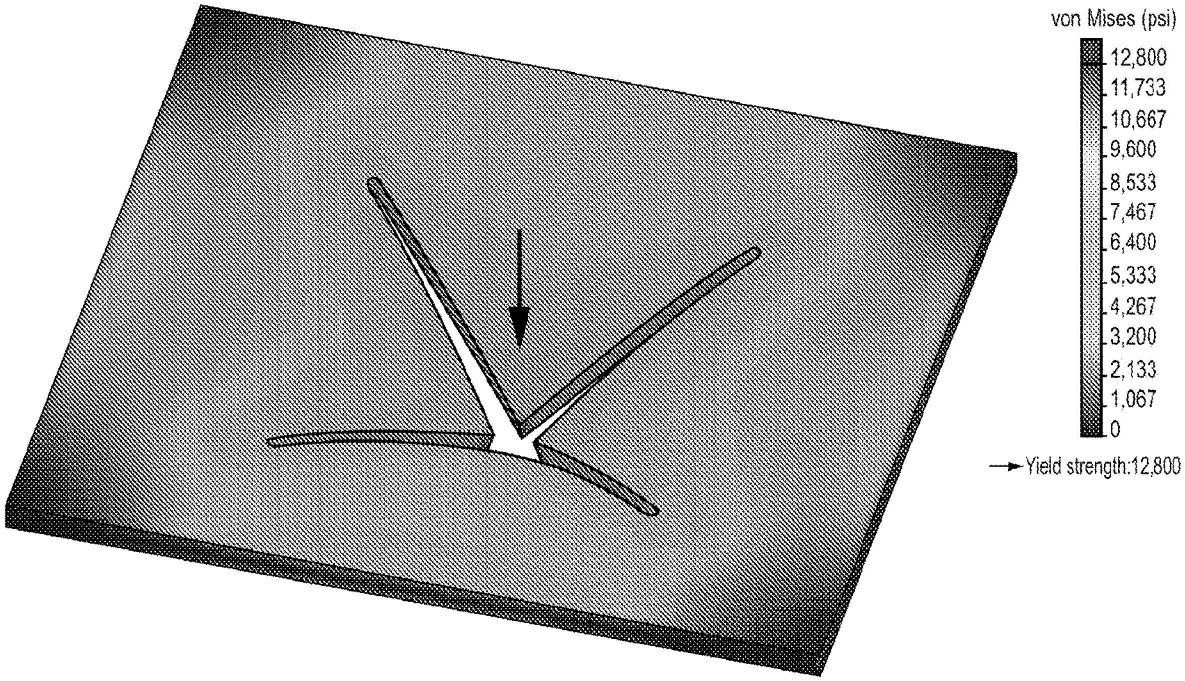
Figure 4D:
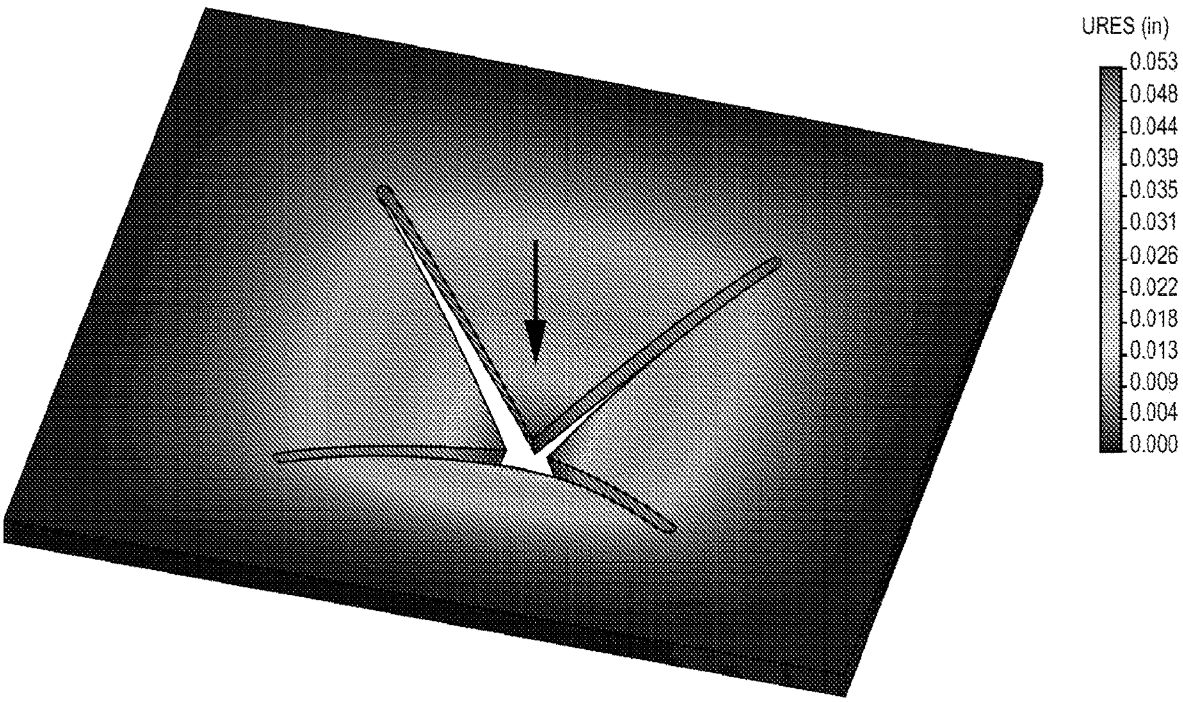
Figure 4E:
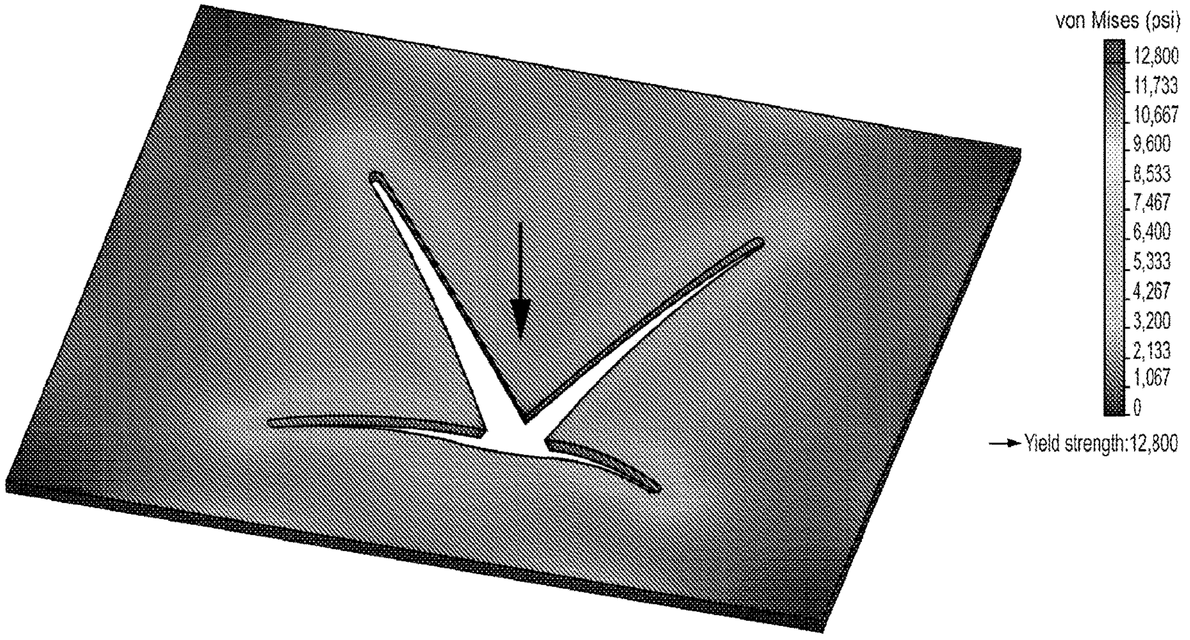
Figure 4F:
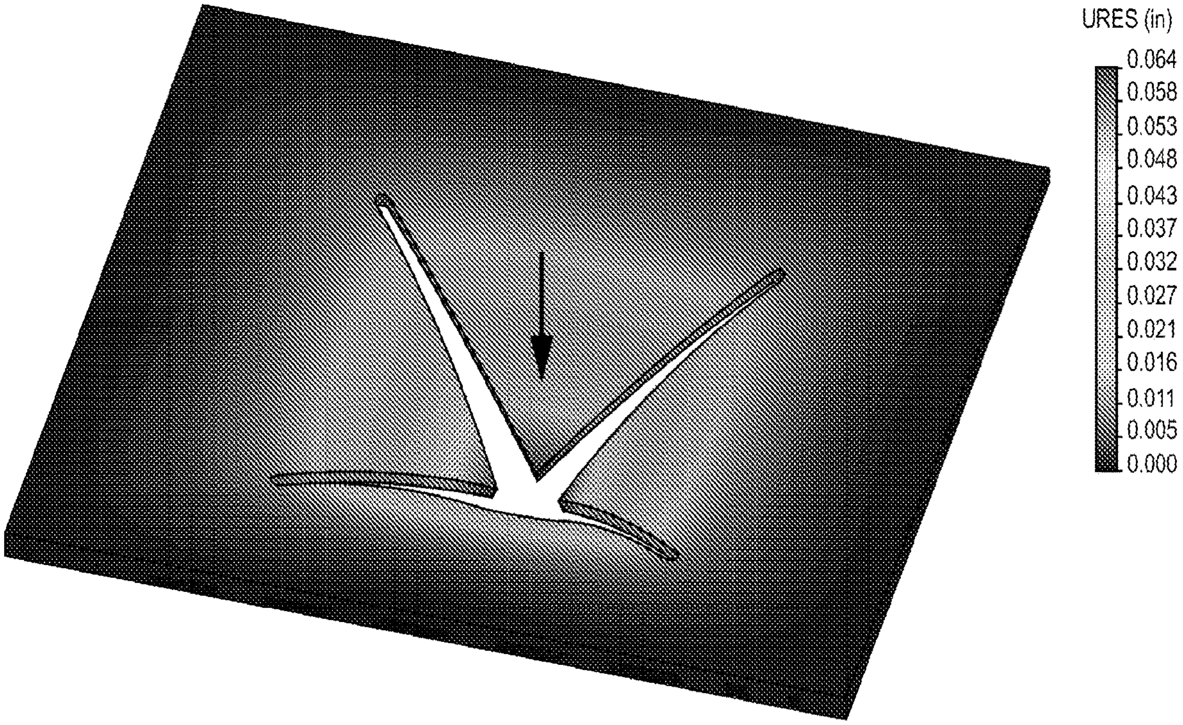

FIGS. 3(*a*) and 3(*b*) illustrate additional embodiments of a removable lid (10*c*) consistent with the disclosure. The lid (10*c*), in conjunction with a suitable container (not shown), may make up a substance containment system (not shown). The lid (10*c*) is similar to lids (10*a*) and lid 10(*b*) and includes all features and functionality of the lid (10*a*) and lid (10*b*) except where explicitly stated. Lid (10*c*) is sized and dimensioned to fit a reagent container having a rectangular prism shape with two sets of cut patterns (12*c*) defining two septal portions (17*c*) in a top surface (13*c*) thereof. The lid of FIGS. 3(*a*) and 3(*b*) is designed to fit over a container such as container (1018) illustrated in FIG. 1. Two pipette tips (1021), controlled by a robotic pipetting system or an automated robotic arm may be inserted into lid (10*c*). The lid is then secured or attached to the pipette tips by frictional force and as the pipette tips (1021) are lifted away from container (1018), lid (10*c*) is also lifted away. When the pipette tips (1018) are ejected and discarded, so is lid (10*c*). The robotic pipetting system may then obtain additional pipette tips to withdraw sample or reagent within the opened container (1018) to conduct or continue the assay or analysis. The lid (10*c*) as shown in FIGS. 3(*a*) and 3(*b*) includes a rim (27*c*) having a periphery (11*c*) surrounding the outer perimeter of the top surface (13*c*) and an outer skirt (18*c*) projecting from the periphery (11*c*), but does not include an inner skirt. The outer skirt (18*c*) is further configured to surround a top edge of a container that lid (10*c*) is placed on. The outer skirt (18*c*) may serve to prevent the lid (10*c*) from sliding or falling off the container.

FIGS. 3(*c*)-3(*e*) illustrate a removable lid (10*d*) and container (14*d*) consistent with embodiments hereof. The lid (10*d*) and container (14*d*) make up a substance containment system (5*d*). The lid (10*d*) is similar to lid (10*a*), lid 10(*b*), and lid 10(*c*) and includes all features and functionality of the lid (10*a*), lid 10(*b*), and lid 10(*c*) except where explicitly stated. FIGS. 3(*c*)-3(*e*) illustrate an embodiment in which the entirety of the rim (27*d*) is configured to rest inside a periphery of a lip of a container (14*d*) that is covered by the lid (10*d*).

The rim (27*d*) is formed by inner skirt (19*d*) projecting approximately vertically downward from the top surface (13*d*) of the lid (10*d*) around a perimeter of the lid (10*d*), the periphery (11*d*) projecting approximately horizontally in all directions from the inner skirt (19*d*) and the outer skirt (19*d*) projecting approximately vertically upward from the periphery (11*d*) around a perimeter of the periphery (11*d*). Further, the lid (10*d*) includes an outer lip (35) projecting approximately horizontally from the outer skirt (18*d*). The lid (10*d*) is configured such that the outer lip (35) can rest on the top edge of the container (14*d*) while the rim (27*d*) is disposed inside of the container (14*d*). Further, the outer lip (35) may be configured such that it does not extend past the top edge (25*d*) of the container (14*d*). In this way, multiple containers (14) may be positioned side by side. The size of the rim (27) may be configured so as to provide a secure but removable fit for the lid (10*d*) atop the container. The rim (27*d*) may be configured such that the weight of the lid combined with the frictional force between the outer skirt (18*d*) and the inner edge of the container (14*d*) is lower than the frictional force provided by the angular segments (16*d*) on an extractor during a removal operation.

In embodiments, the outer skirt (18*d*) may be configured to contact the inner edge of the container (14*d*). In further embodiments, the outer skirt (18*d*) may be configured and sized such that the lid (10*d*) can rest on the top edge of the container (14*d*) with no contact between the outer skirt (18*d*) and the container (14*d*). In embodiments, the inner skirt (19*d*), outer skirt (18*d*), periphery (11*d*), and outer lip (35) may project at angles differing from those above while still suitably maintaining the lid (10*d*) atop the container (14*d*).

FIGS. 4(*a*)-4(*f*) show results of Finite Element Analysis (FEA) conducted on a simplified lid design consistent with embodiments hereof and having four angular segments. The analysis is limited to the area around the cut pattern, e.g., the septal portion, and is based on a force of 0.2 lbf applied to the cut pattern. The coefficient of friction between the angular segments and the extractor/pipette tip is approximately 0.250. The plots of stress (4(*a*), 4(*c*), 4(*e*)) are normalized so that the maximum plotted value equals the yield strength of the material and thickness of the lid as modeled. A yield strength or yield point of a material is defined as the stress at which the material begins to deform plastically. Before reaching the yield point the material will deform elastically and will return to its original shape when the applied stress is removed. Once the yield point is passed, some fraction of the deformation will be permanent and non-reversible.

FIG. 4(*a*) show a 3-D stress plot of a HDPE lid with a thickness of about 0.010 inch and FIG. 4(*b*) shows a 3-D displacement plot of same. FIGS. 4(*c*)-(*d*) are similar plots based on a PVC lid having a 0.010-inch thickness, and FIGS. 4(*e*)-(*f*) are similar plots based on a PVC lid having a 0.005-inch thickness. FIGS. 4(*a*), (*c*) and (*e*) show that, for each of these examples, the displacement of angular segments is both plastic and elastic. A portion of the deformation being elastic indicates that the angular segments may continue to provide force to an extractor inserted therethrough. A portion of the deformation being plastic indicates that, when the extractor is removed, the angular segments do not return to their original positions. Because the intention is that the lid be discarded and no longer used as a cover, it is not required that the angular segments return to their original positions.

In some conventional products, it is required that the materials and design of a lid with a puncture therethrough return elastically to its original shape and hence remain in the elastic deformation regime. Such is necessary for the continued operation of the lid as a cover. Savings may be realized by not requiring lid designs that remain in the elastic deformation regime, including but not limited to using non-elastomeric materials, using thinner materials, and eliminating the need to have a tight fit between the lid and the container to keep the lid on top of the container, etc. Accordingly, in embodiments, the angular segments of a lid may be configured for plastic deformation when an extractor is inserted therethrough.

Figure 5A:
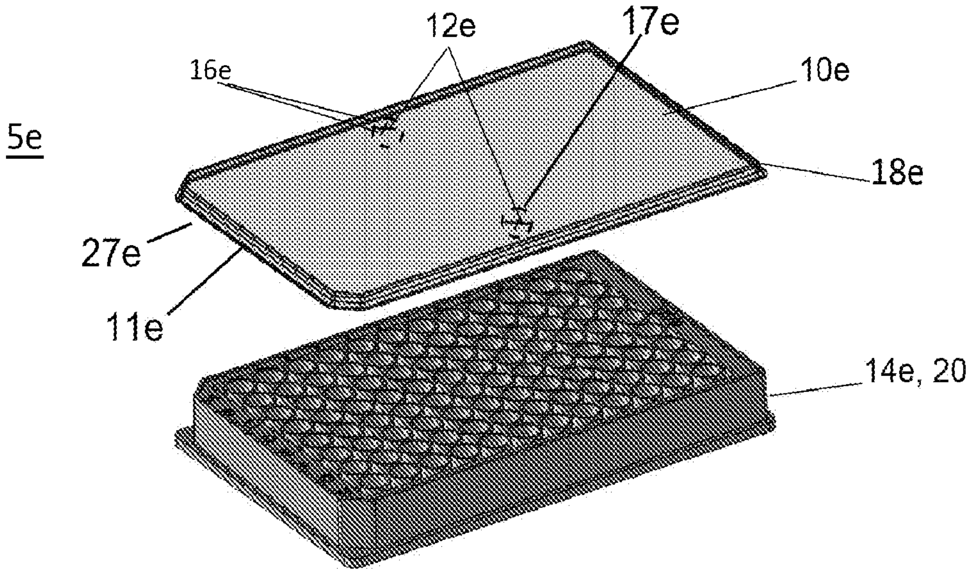
FIGS. 5(*a*)-5(*b*) are exploded views of removable lids sized and dimensioned for multi-well plates according to embodiments hereof.
Figure 5B:
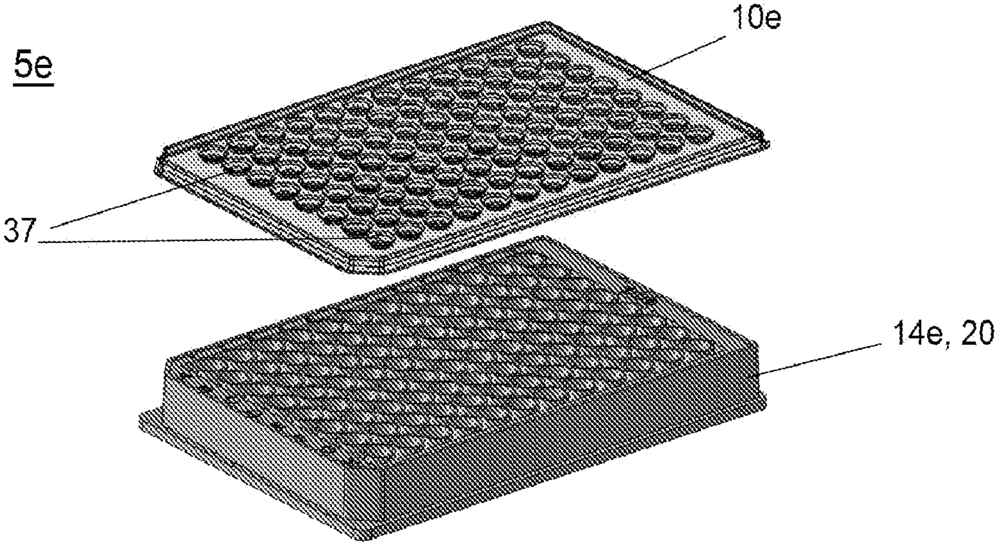

FIGS. 5(*a*) and 5(*b*) illustrate a lid (10*e*) and container (14*e*) consistent with embodiments hereof. The lid (10*e*) and container (14*e*) make up a substance containment system (5*e*). The lid (10*e*) is similar to lid 10(*c*) and includes all features and functionality of the lid (10*c*) except where explicitly stated. Lid (1010) may be sized and dimensioned to fit loosely over a container (14*e*). In this embodiment, the container may be a multi-well plate (20). The multi-well plate (20), when filled with reagents and samples may be incubated on a shaker/heater, such as those disclosed in commonly owned WO 2018/017156 and WO 2017/015636, as well as WO 2016/164477, for a significant amount of time. A lid (10*e*) placed on the multi-well plate (20) may reduce the evaporation and/or exposure to light of reagents and samples. Similar to previous embodiments, the lid (10*e*) illustrated in FIG. 5(*a*) includes at least one (as pictured, two) cut pattern (12*e*) and angular segments (16*e*) defining a septal portion (17*e*) adapted to be pierced and lifted by extractor(s) or pipette tips (1021), as discussed above. The lid (10*e*) as includes a rim (27*e*) having a periphery (11*e*) surrounding the outer perimeter of the top surface (13*e*) and an outer skirt (18*e*) projecting from the periphery (11*e*), but does not include an inner skirt. The outer skirt 18(*e*) is configured to surround a top of the multi-well plate (20) when the lid (10*e*) is placed on the multi-well plate (20). Lid (10*e*), as shown in FIG. 5(*b*), may further include downward oriented dimples (35). The downward oriented dimples may serve to further reduce evaporation by providing a surface on which evaporated moisture may condense and drip back into the wells of the multi-well plate (20). Each cut pattern (12*e*) be disposed within the area of a single dimple (35).

Figure 6A:
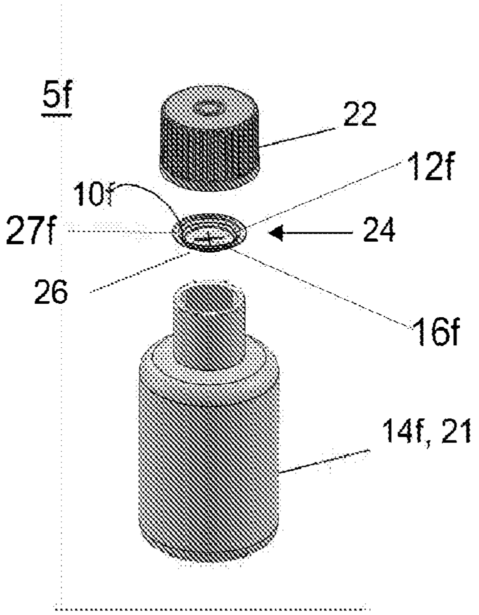
FIG. 6 is an exploded view of a removable lid composite according to embodiments hereof.
Figure 6B:
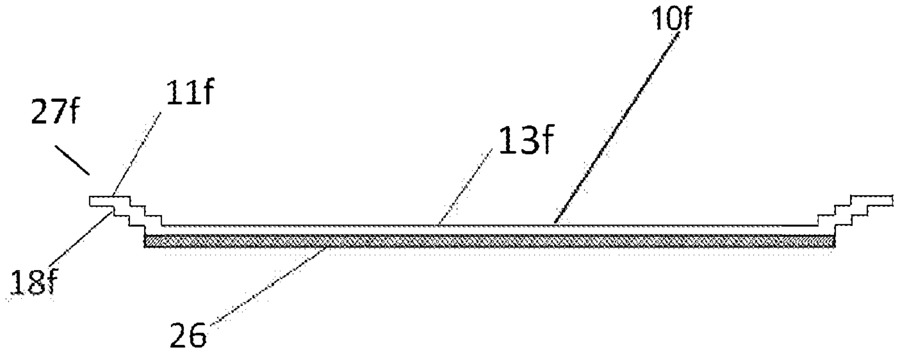

FIG. 6 illustrates a removable lid and container consistent with embodiments hereof. FIG. 6(*b*) illustrates the lid 10(*f*) in cross section. The lid (10*f*) is configured for installation on a reagent bottle (21) as the container. The lid (10*f*) and reagent bottle (21) make up a substance containment system (5*f*). The lid (10*f*) is similar to lids 10(*a*), 10(*b*), 10(*c*), 10(*d*), and 10(*e*) and includes all features and functionality of these lids except where explicitly stated. The lid (10*f*) includes cut lines (12*f*) in a top surface 13(*f*) thereof and angular segments (16*f*) defining a septal portion (not shown), and a rim (27*f*). The rim (27*f*) includes an outer skirt (18*f*) and a periphery (11*f*) configured to contact a top edge of the container (14*f*) and permit the lid (10*f*) to rest on the container (14*f*). The lid (10*f*) further includes a sealing layer (26) adhered to an underside of the top surface (13*f*), including a pierceable or frangible material secured to the lid (10*f*). The sealing layer (26) provides a seal between the lid (10*f*) and the top of the container (14*f*). During use, the pipettes or extractor(s) may pierce the sealing layer during insertion through the septal portion. In embodiments, the lid (10*f*) may be pre-installed on the reagent bottle (21) and held in place by the cap (22) to provide a liquid tight seal on the reagent bottle (21).

The sealing layer (26) is configured to seal the top of the reagent bottle 21 when the lid (10*f*) is placed atop it. The sealing layer (26) may extend coextensively with the top surface 13(*f*) and/or may extend farther or less far to provide an appropriate seal. In embodiments, the sealing layer (26) may extend only to cover the cut pattern 12(*f*).

In further embodiments, the lid (10*f*) may be placed on the reagent bottle (21) after the cap (22) of the reagent bottle (21) has been removed, e.g., prior to placement in an assay system during preparation steps.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A lid adapted for use in an automated system, comprising:

a top surface;

a rim disposed around an outer perimeter of the top surface, the rim comprising a periphery extending horizontally and at least one skirt projecting vertically from the periphery, the periphery contacting a lip portion of a container and the at least one skirt extending below the lip portion of the container without gripping the container when the periphery contacts the lip portion of the container; and a plurality of angular segments in the top surface defined by a cut pattern in the top surface and defining a septal portion of the top surface, when the periphery contacts the lip portion of the container the angular segments are configured to:

permit at least one pipette tip of the automated system disposed on an extractor to be inserted through the cut pattern, deform both elastically and plastically in response to the at least one pipette tip being inserted through the cut pattern, and grip the at least one pipette tip by a friction force in response to the deformation, wherein the friction force is greater than a weight of the lid such that the lid is removed from the container when the extractor is pulled away from the container.

2. The lid of claim 1, wherein a mass of the lid is less than 5 grams.

3. The lid of claim 1, wherein a mass of the lid is less than 2.5 grams.

4. The lid of claim 1, wherein a mass of the lid is less than 1 gram.

5. The lid of claim 1, wherein a mass of the lid is less than 0.75 gram.

6. The lid of claim 1, wherein the angular segments are coated with a frictional enhancement material.

7. The lid of claim 1, further comprising a pierceable liquid tight layer.

8. The lid of claim 1, wherein the top surface includes a material that is at one of: substantially clear, opaque, or UV resistant.

9. The lid of claim 1, wherein the top surface includes a hydrophobic material or a hydrophobic coating.

10. The lid of claim 1, further comprising high density polyethylene or polyvinyl chloride.

11. The lid of claim 1, further comprising at least one of a conductive material, anti static material, and static dissipative material.

12. The lid of claim 1, wherein the top surface has a thickness from 0.0025 inch to 0.030 inch.

13. A substance containment system for use in an automated system, the substance containment system comprising:

a container configured to contain the substance;

at least one pipette for use with the automated system; and a lid configured to cover the container, the lid comprising:

a top surface;

a rim disposed around an outer perimeter of the top surface, the rim comprising a periphery extending horizontally and at least one skirt projecting vertically from the periphery, the periphery being configured to contact a lip portion of the container and the at least one skirt being configured to extend below the lip container without gripping the container when the periphery contacts the lip portion of the container;

a plurality of angular segments in the top surface defined by a cut pattern in the top surface and defining a septal portion of the top surface, the angular segments being configured to:

permit at least one pipette tip of the automated system disposed on an extractor to be inserted through the cut pattern, deform both elastically and plastically in response to the at least one pipette tip being inserted through the cut pattern, and grip the at least one pipette tip by a friction force in response to the deformation, wherein the friction force is greater than a weight of the lid such that the lid is removed from the container when the extractor is pulled away from the container.

14. The substance containment system of claim 13, wherein the container is configured to contain a reagent or sample.

15. The substance containment system of claim 13, wherein the friction force is greater than a combined force provided by a weight of the lid and a rim-container friction force between the rim and the container when the at least one pipette tip is inserted through the cut pattern.

16. The lid of claim 1, wherein a material and a surface roughness of the angular segments are selected to provide the friction force.

* * * * *